United States Patent
Singh et al.

(10) Patent No.: US 9,425,944 B1
(45) Date of Patent: Aug. 23, 2016

(54) INTELLIGENT ALLOCATION OF WIRELESS RESOURCES BETWEEN ACCESS LINK AND RELAY LINK

(71) Applicant: Sprint Spectrum L.P., Overland Park, KS (US)

(72) Inventors: Jasinder P. Singh, Olathe, KS (US); Siddharth S. Oroskar, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 469 days.

(21) Appl. No.: 14/077,445

(22) Filed: Nov. 12, 2013

(51) Int. Cl.
*H04B 7/00* (2006.01)
*H04L 5/00* (2006.01)
*H04W 52/02* (2009.01)

(52) U.S. Cl.
CPC ......... *H04L 5/0058* (2013.01); *H04W 52/0212* (2013.01)

(58) Field of Classification Search
CPC ............ H04W 72/04; H04W 72/0406; H04W 72/0453; H04W 72/048
USPC ................... 370/310, 315, 328, 329, 340, 341
See application file for complete search history.

(56) References Cited

U.S. PATENT DOCUMENTS

| | | | | |
|---|---|---|---|---|
| 8,619,653 | B2 * | 12/2013 | Ji | H04W 52/0216 370/311 |
| 8,619,654 | B2 * | 12/2013 | Yang | H04W 52/0277 370/252 |
| 8,886,113 | B2 * | 11/2014 | Palanki | H04B 7/155 455/11.1 |
| 9,185,646 | B2 * | 11/2015 | Li | H04W 52/0206 |
| 9,232,516 | B1 * | 1/2016 | Oroskar | H04W 16/26 |
| 2013/0051261 | A1 * | 2/2013 | Kazmi | H04B 7/0693 370/252 |
| 2014/0364079 | A1 * | 12/2014 | DiFazio | H04W 88/04 455/404.1 |

* cited by examiner

*Primary Examiner* — Dmitry H Levitan

(57) ABSTRACT

A method and systems for allocating wireless communication resources between access link and relay link. An example method involves determining a remaining battery level of one or more user equipment devices (UEs) that are served by a relay base station. The method also involves establishing an allocation of wireless communication resources between a relay backhaul link and a relay access link based at least on the determined remaining battery level of the one or more UEs. And the method then involves, responsive to the establishing of the allocation of the wireless communication resources, configuring the relay backhaul link and the relay access link based on the established allocation of the wireless communication resources.

20 Claims, 5 Drawing Sheets

INTELLIGENT ALLOCATION OF WIRELESS RESOURCES BETWEEN ACCESS LINK AND RELAY LINK

BACKGROUND

Unless otherwise indicated herein, the materials described in this section are not prior art to the claims and are not admitted to be prior art by inclusion in this section.

A typical cellular wireless communication system provides numerous wireless coverage areas in which served user equipment (UE) devices can operate. Each wireless coverage area is defined by radio frequency radiation from a respective cellular base station, and each base station, together with additional network infrastructure, may provide connectivity with one or more transport networks such as the public switched telephone network (PSTN) and the Internet. With this arrangement, a UE that is positioned within a given wireless coverage area may be served by the base station defining that coverage area and may thereby engage in communication, via that base station and perhaps additional network infrastructure, with one or more other UEs, network servers, and other entities.

In an ideal arrangement, the base stations of a cellular wireless system would provide seamless coverage throughout a region, so that UEs being served by the system could move from coverage area to coverage area without losing connectivity. In practice, however, it may not be possible to operate a sufficient number of base stations or to position the base stations in locations necessary to provide seamless coverage. As a result, there may be holes in coverage.

One way to help solve this problem is to install a wireless relay that extends the range of a base station's coverage area so as to partially or completely fill a coverage hole. Such a relay may be configured with a wireless backhaul interface for communicating with the base station in much that same way a UE does, and a wireless access interface for communicating with and serving one or more UEs in much the same way that a base station does. The relay may further include control logic for actively bridging the backhaul communications with the access communications. The relay may thus receive and recover downlink communications from the base station and transmit those communications to UEs, and receive and recover uplink communications from UEs and transmit those communications to a base station.

Advantageously, a relay base station can have a relatively small form factor, with antenna height lower than the donor base station and with reduced transmit power requirements.

Consequently, a cellular wireless service provider may conveniently employ such relay base stations throughout a region to efficiently fill coverage holes and help improve service quality.

Typically, a base station with which a wireless relay communicates is referred to as a donor base station, and the wireless relay itself is referred to as a relay base station. Further, the wireless communication link between the relay base station and the donor base station is then referred to as a relay backhaul link, and the wireless communication link between the relay base station and UEs is referred to as a relay access link. Similarly, the wireless communication link between the donor base station and UEs is referred to as the donor access link.

OVERVIEW

In certain relay implementations, the relay access link may share an extent of air interface resources with the donor access link. For instance, the relay access communication and the donor access communication may both occur on the same extent of frequency spectrum, such as the same carrier frequency or frequencies. The relay base station and the donor base station will have different physical cell identifiers though, and thus appear to UEs as different base stations.

With such an arrangement, the relay backhaul communication may then occur either: (1) on the same extent of air interface resources used for relay access communication and donor access communication, or (2) on a separate extent of air interface resources reserved exclusively for relay backhaul communication. For example, the relay access link, the donor access link, and the relay backhaul link may all use the same extent of frequency spectrum, or alternatively, the relay access link may share a first extent of frequency spectrum with the donor access link while the relay backhaul link uses a second extent of frequency spectrum.

In practice, there may be a limited amount of wireless communication resources for allocation between access link use and relay backhaul link use. At issue is how the limited amount of wireless communication resources should be allocated between access link use and relay backhaul link use.

Consider an example in which a limited number of carrier frequencies are available for allocation between an access link and a relay backhaul link. In such an example, it may be desirable to allocate all of the available carrier frequencies to access link use. Generally, if more carrier frequencies are available, more UEs can be served on the access link. Therefore, it may be desirable to allocate all of the available carrier frequencies for access link use to increase the number of UEs that may be served.

Furthermore, if multiple carrier frequencies are available for access link use, a base station may engage in carrier aggregation. In wireless communication systems that support carrier aggregation, multiple carrier frequencies from either contiguous frequency bands or non-contiguous frequency bands can be aggregated to increase the bandwidth available to a UE. By way of example, according to the Long Term Evolution (LTE) Advanced air interface protocol, the maximum bandwidth for a data transaction between a base station and a UE is 20 MHz. A base station may increase the maximum available bandwidth by engaging in carrier aggregation. For instance, the base station may increase the number of resource blocks provided to a UE at once by aggregating up to five carrier frequencies. Advantageously, the increased bandwidth provided by carrier aggregation leads to quicker data transactions between a UE and a base station, and as a result, reduced battery consumption for the UE. Therefore, allocating all of the available carrier frequencies for access link use may also improve data speeds and extend UE battery life.

On the other hand, it may also be desirable to dedicate one or more of the available carrier frequencies exclusively for relay backhaul link use. If one or more carrier frequencies are not reserved exclusively for relay backhaul link use, overcrowding of the donor base station may negatively affect the relay backhaul link. For instance, if the donor base station is overloaded due to high data traffic from UEs, the relay backhaul link may be forced to compete with the UEs served by the donor base station for resource blocks. Dedicating one or more carrier frequencies for relay backhaul link use and using the remaining carrier frequencies for access link use would eliminate any contention due to overcrowding of the donor base station. Unfortunately, at the same time, reserving one or more of the available carrier frequencies for relay backhaul link use would necessarily also reduce the number of carrier frequencies available for carrier aggregation on the access link, or for use on the access link as a general matter, regardless of whether carrier aggregation is used.

Disclosed herein is a method and corresponding system to help address this problem. In accordance with the disclosure, a base station, or other entity, may be arranged to intelligently allocate wireless resources between a relay access link and a relay backhaul link. In one instance, a donor base station may determine a remaining battery level (e.g., remaining battery energy or charge) of UEs served by a relay base station and establish an allocation of wireless communication resources between the relay access link and the relay backhaul link based at least on the determined remaining battery level. The donor base station may then provide instructions to the relay base station for configuring the relay backhaul link and the relay access link based on the established allocation. If the relay access link and the donor access link share the same extent of wireless communication resources, the donor base station may also configure its donor access link in the same manner as the relay access link.

In another instance, a relay base station may determine the remaining battery level of UEs served by the relay base station and establish an allocation of wireless communication resources between the relay access link and the relay backhaul link based at least on the determined remaining battery level. The relay base station may then configure the relay access link and the relay backhaul link, and provide instructions to the donor base station indicating the wireless communication resources that will be used for the relay access link and the relay backhaul link. If the relay access link and the donor access link share the same extent of wireless communication resources, the donor station may then configure its donor access link in the same manner as the relay access link.

In one example, if four carrier frequencies are available and the determined remaining battery level is below a predefined threshold, a base station may opt to allocate three of the carriers for access link use and allocate the remaining carrier to the relay backhaul link. In another example, if a certain bandwidth of frequency spectrum is available and the determined remaining battery level is below a predefined threshold, the base station may opt to allocate three-fourths of the bandwidth to the access link and the remaining portion of the bandwidth to the relay backhaul link. On the other hand, if the determined remaining battery level is above a predefined threshold, the base station may opt to evenly split the bandwidth or, if reason exists to do so, to allocate more frequency spectrum to the relay backhaul link than to the relay access link.

Additionally, when establishing the allocation, the base station may also take into consideration an amount of downlink buffered data to be transmitted from the donor base station to the one or more UEs that are served by the relay base station. In other instances, the base station may also take into consideration an amount of uplink buffered data that the one or more UEs that are served by the relay base station are requesting to transmit to the relay base station.

Furthermore, in an example in which the allocation of wireless communication resources is determined by the donor base station, the donor base station may also take into consideration one or more factors of UEs that are served by the donor base station on the donor access link. For example, the donor base station may determine one or any combination of a remaining battery level of the UEs served by the donor base station, an amount of downlink buffered data to be transmitted from the donor base station to the UEs served by the donor base station, and an amount of uplink buffered data that the UEs served by the donor base station are requesting to transmit to the donor base station.

Accordingly, in one respect, disclosed is a method that may involve determining a remaining battery level of one or more UEs that are served by a relay base station. The one or more UEs may communicate with the relay base station over a relay access link, and the relay base station may in turn communicate with a donor base station over a relay backhaul link. Further, the method may involve establishing an allocation of wireless communication resources between the relay backhaul link and the relay access link based at least on the determined remaining battery level of the one or more UEs. The method may then involve, responsive to the establishing the allocation of the wireless communication resources, configuring the relay backhaul link and the relay access link based on the established allocation of the wireless communication resources.

In another respect, disclosed is a donor base station. The donor base station may include a wireless communication module, a processing unit, data storage, and program logic stored in the data storage. The wireless communication module may be arranged for engaging in access communication with a first extent of UEs over a donor access link and for engaging in relay backhaul communication with a relay base station over a relay backhaul link. The relay base station may in turn engage in access communication with a second extent of UEs over a relay access link. Additionally, the program logic may be executable by the processing unit to manage allocation of wireless communication resources between the donor access link, the relay access link, and the donor access link. Managing allocation of the wireless communication resources between the donor access link, the relay access link, and the relay backhaul link may involve carrying out functions including (i) determining a remaining battery level of one or more UEs of the first extent of UEs, the second extent of UEs, or both; (ii) based at least on the determined remaining battery level of each of the one or more UEs, establishing an allocation of the wireless communication resources between the donor access link, the relay access link, and the relay backhaul link; and (iii) causing the relay base station to configure the relay backhaul link and the relay access link based on the established allocation of the wireless communication resources.

Still further, in another respect, disclosed is a non-transitory computer readable medium having stored thereon instructions executable by a processing unit to carry out functions. The functions may be carried out in a wireless communication system in which a donor base station engages in access communication with a first extent of UEs over a donor access link and engages in relay backhaul communication with a relay base station over a relay backhaul link, and the relay base station in turn engages in access communication with a second extent of UEs over a relay access link. The functions may involve determining a remaining battery level of one or more UEs of the first extent of UEs, the second extent of UEs, or both. Further, the functions may involve, based at least on the determined remaining battery level of each of the one or more UEs, establishing an allocation of wireless communication resources between the donor access link, the relay access link, and the relay backhaul link. The functions may then involve, responsive to establishing the allocation of the wireless communication resources, configuring the donor access link, the relay access link, and the relay backhaul link based on the established allocation of the wireless communication resources.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
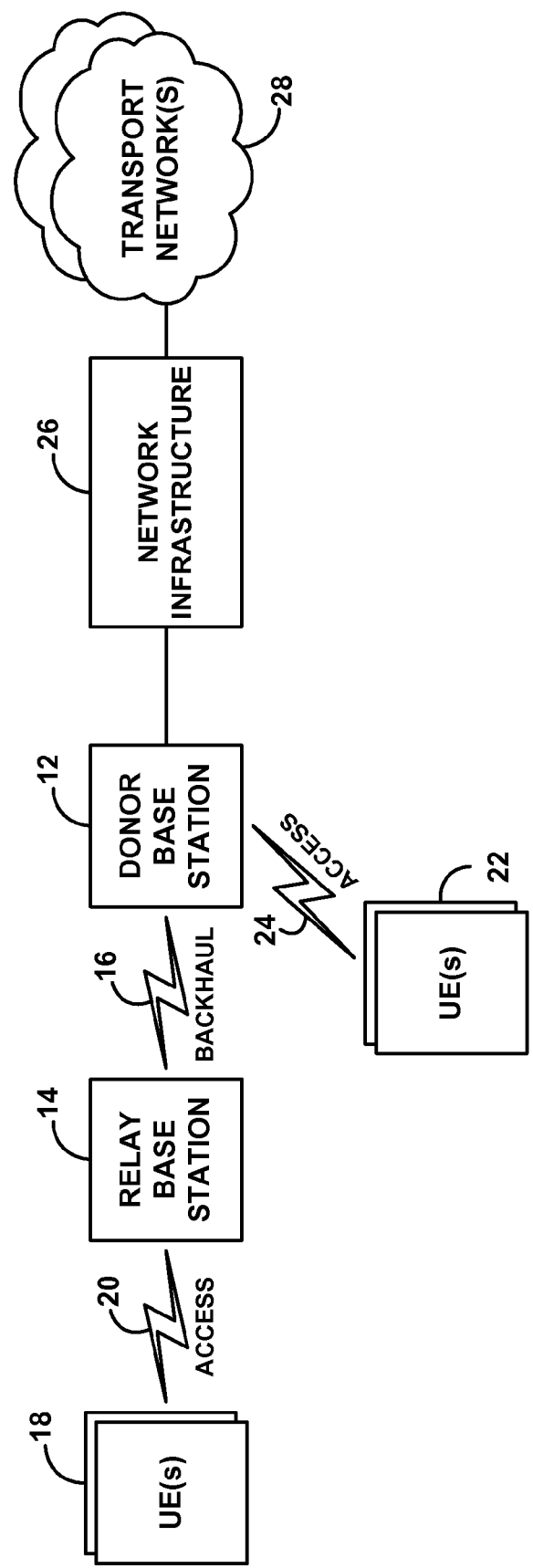
FIG. 1 is a simplified block diagram of a wireless communication system in which the present method can be implemented.

Referring to the drawings, as noted above, FIG. 1 is a simplified block diagram of a wireless communication system in which the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 1, the representative wireless communication system includes a primary or donor base station 12 serving a relay base station 14 via a relay backhaul link 16, and the relay base station 14 then serving one or more UEs 18 via a relay access link 20. Donor base station 12 is also shown serving one or more UEs 22 via a donor access link 24. Each of the relay backhaul link 16, relay access link 20, and donor access link 24 may be an air interface. Further base station 12 is shown coupled with network infrastructure (such as a switch, gateway, mobility manager, or the like) 26, which provides connectivity or facilitates communication with one or more transport networks 28 such as the PSTN or the Internet for instance.

With this arrangement, control and bearer data may pass in the downlink direction from the donor base station 12 to the relay base station 14 and in turn from the relay base station to a served UE 18, and control and bearer data may likewise pass in the uplink direction from a served UE to the relay base station and in turn to the donor base station. For example, when a UE enters coverage of the relay base station 14, the UE may register with the relay base station via the relay access link 20, and the relay base station may correspondingly register the UE with the donor base station via the relay backhaul link 16. Thereafter, when the donor base station seeks to transmit a page message to the UE, the donor base station may transmit the page message to the relay base station via the backhaul link, and the relay base station may then transmit the page message to the UE via the access link in a paging subframe that the UE would be arranged to read. Likewise, when the UE engages in active bearer communication (e.g., wireless packet data communication), bearer data may flow between the UE and the relay base station via the access link and via the relay base station and the donor base station via the backhaul link.

Figure 2:
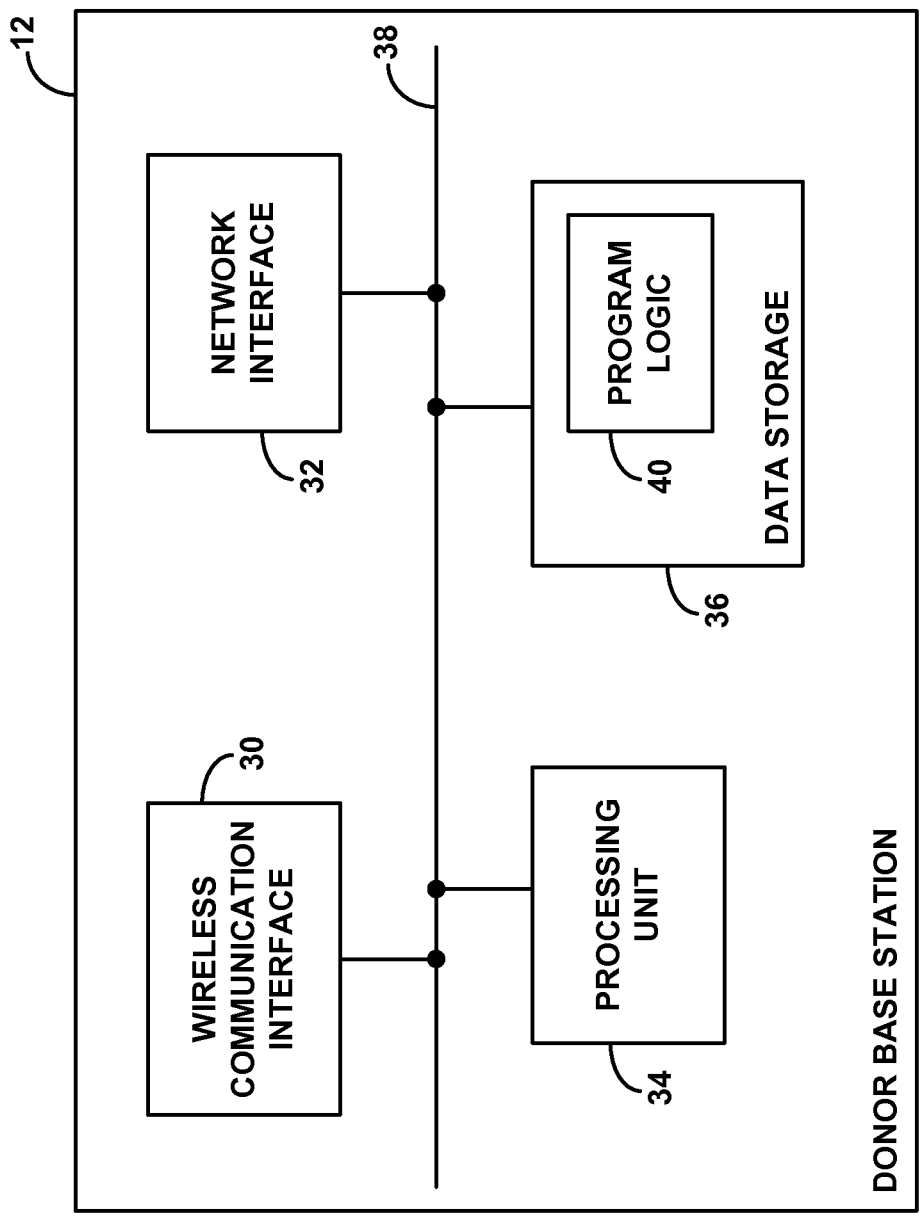
FIG. 2 is a simplified block diagram of a donor base station operable in the arrangement of FIG. 1.

FIG. 2 is next a simplified block diagram of a representative donor base station 12, such as a base transceiver station, access node, access point, Node-B, or eNodeB, for instance (whether macro, femto or the like), illustrating some of the components that can be included in such an entity. As shown in FIG. 2, the representative donor base station 12 includes a wireless communication interface 30, a network interface 32, a processing unit 34, and data storage 36, all of which may be coupled together by a system bus, network or other connection mechanism 38.

Wireless communication interface 30 may function to engage in air interface communication with served devices, such as the relay base station 14 and UEs 22. As such, the wireless communication interface 26 may comprise an antenna arrangement (not shown), which may be tower mounted, and associated components such as a power amplifier and a cell site modem (not shown), so as to transmit and receive bearer and control data. Network interface 32 may then comprise a wired or wireless interface for communicating with the network infrastructure 28 for instance.

Processing unit may then comprise one or more general purpose processors (e.g., microprocessors) and/or one or more special-purpose processors (e.g., digital signal processors and/or application specific integrated circuits) and may be integrated in whole or in part with the wireless communication interface 30. And data storage 36 may comprise one or more volatile and/or non-volatile storage components, such as magnetic, optical, flash, or other types of non-transitory computer readable media, and may be integrated in whole or in part with processing unit 34.

As shown, data storage 36 may store program logic (e.g., machine language instructions) 40, which may be executable by processing unit 34 to carry out various donor base station functions described herein. For instance, the program logic 40 may be executable to cause the donor base station to establish an allocation of wireless communication resources between access link and relay link use, in accordance with the present method.

Figure 3:
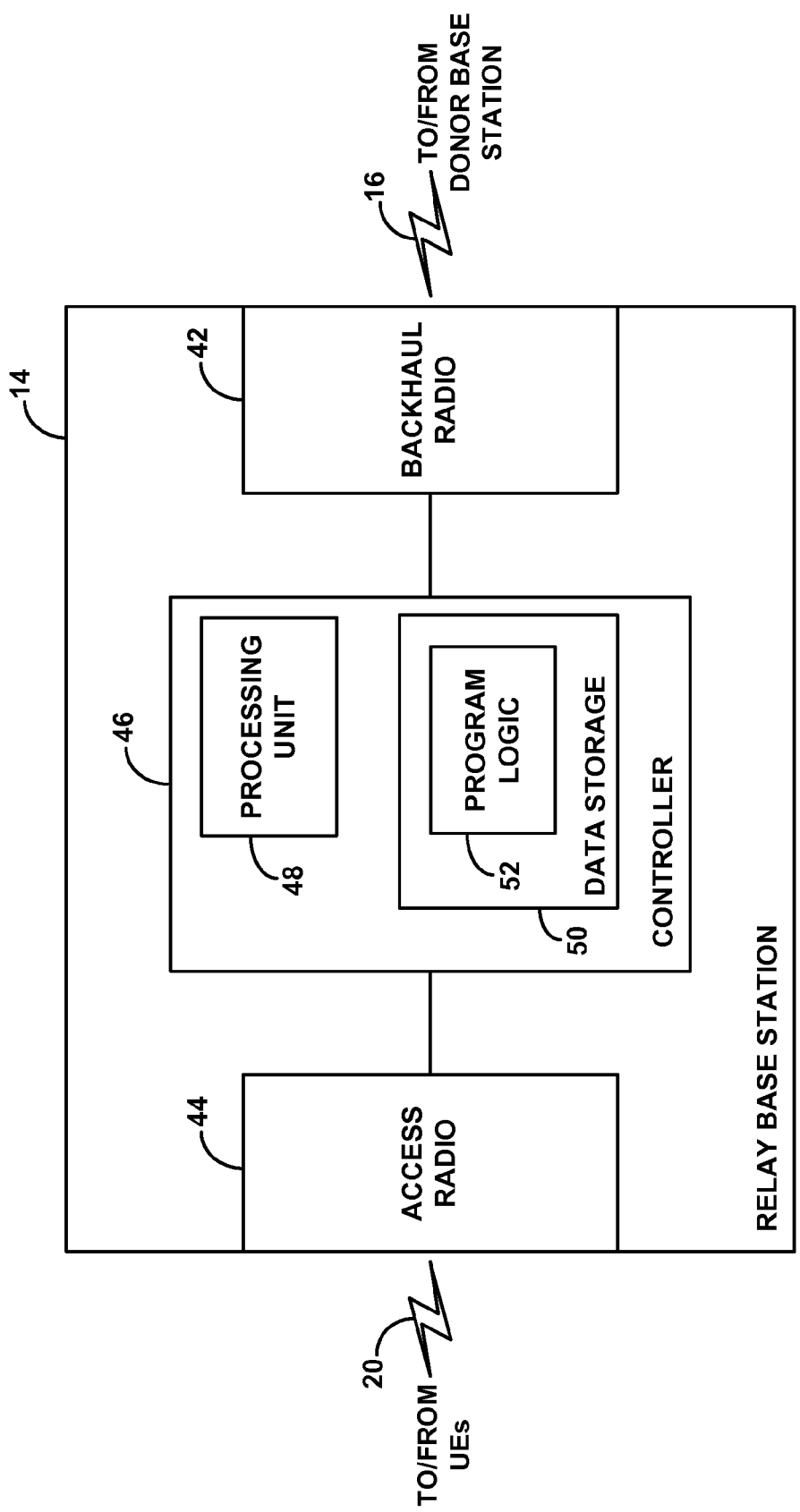
FIG. 3 is a simplified block diagram of a relay base station operable in the arrangement of FIG. 1.

FIG. 3 is next a simplified block diagram depicting a representative relay base station 14, illustrating some of the components that can be included in such an entity. As shown, the representative relay base station 14 includes a wireless communication module comprising a backhaul radio 42 and an access radio 44, and a controller 46 for bridging communications between the backhaul radio and access radio.

Although the figure depicts these components as discrete blocks, the components may be integrated together in various ways or provided in other forms. For instance, the backhaul radio 42 and access radio 44 may be integrated together, perhaps on a single chipset. Further, the controller 46 may be integrated with either or both of the radios. Still further, although the figure depicts the controller with direct links to each of the radios, in an alternative arrangement the relay base station may include a system bus, network, or other connection mechanism to which the radios and controller may be communicatively linked. Other arrangements are possible as well.

In the illustrated relay base station, the backhaul radio 42 may function to engage in backhaul wireless communication with donor base station 12 via the relay backhaul link 16. To facilitate this, backhaul radio 42 may be largely the same type of radio that would be included in a UE designed to be served by a base station. The backhaul radio 42 may thus include an antenna arrangement (not shown) and associated components to facilitate transmitting and receiving bearer and control data in communication with the donor base station 12.

The access radio 44, on the other hand, may function to engage in access wireless communication with the one or more UEs 18. To facilitate this, the access radio 44 may be largely the same type of radio that would be included in a donor base station designed to serve such UEs. The access radio 44 may thus include an antenna arrangement (not shown) and associated components to facilitate transmitting and receiving bearer and control data in communication with the one or more UEs 18.

Controller 46, in turn, may function to actively bridge communications of the backhaul radio 42 with communications of the access radio 44, and thus to bridge backhaul wireless communications between the donor base station 12 and the relay base station 14 with access wireless communications between the relay base station 14 and the served UEs 18. As such, as backhaul radio 42 receives downlink communications from the donor base station 12, controller 46 may receive those communications from the backhaul radio and may then pass the communications to the access radio 44, and the access radio 44 may transmit the communications to served UEs 18. Likewise, as access radio 44 receives uplink communications from served UEs 18, controller 46 may receive those communications from the access radio and may then pass the communications to the backhaul radio 42, and the backhaul radio may then transmit the communications to the donor base station 12.

In the example arrangement shown, controller 46 includes a processing unit 48 and data storage 50. Processing unit 48 may comprise one or more general purpose processors (e.g., microprocessors) and/or one or more special purpose processors (e.g., digital signal processors and/or application specific integrated circuits). And data storage 50 may comprise one or more volatile and/or non-volatile storage components, such as magnetic, optical, flash, or other types of non-transitory computer readable media, and may be integrated in whole or in part with processing unit 48.

As shown, data storage 50 may store program logic (e.g., machine language instructions) 52, which may be executable by processing unit 48 to carry out various relay base station functions described herein. For instance, the program logic 52 may be executable to cause the relay base station to interwork with the donor base station 12 so as to configure the relay backhaul link 16 and the access link 20 based on an established allocation of wireless communication resources, in accordance with the present method.

In practice, in the arrangement of FIG. 1, relay backhaul link 16, relay access link 20, and donor access link 24 may use a common air interface protocol. By way of example, the common air interface protocol may be LTE. Other examples of air interface protocols include CDMA (e.g., 1×RTT or 1×EV-DO), WiMAX, IDEN, GSM, GPRS, UTMS, EDGE, MMDS, WIFI, and BLUETOOTH.

Further, as discussed above, relay access link 20 and donor access link 24 may share a common extent of air interface resources, such as the same carrier frequency, bandwidth of frequency spectrum, or other common communication channel. The relay backhaul communication may then occur either: (1) on a dedicated extent of air interface resources reserved exclusively for relay backhaul communication, or (2) on the same extent (or a portion of the same extent) of air interface resources used for relay access communication and donor access communication. For example, the relay backhaul link 16 may use a dedicated carrier frequency, or alternatively, the relay backhaul link 16 may share one or more carrier frequencies that are also used for access communication with the relay access link 20 and the donor access link 24.

Figure 4A:
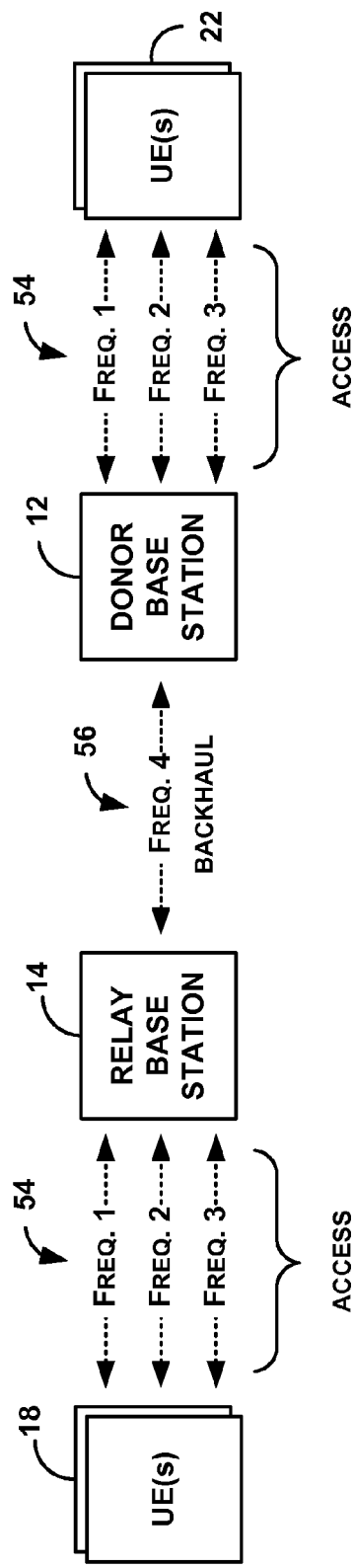
FIGS. 4A and 4B are conceptual illustrations of example allocations of wireless communication resources.
Figure 4B:
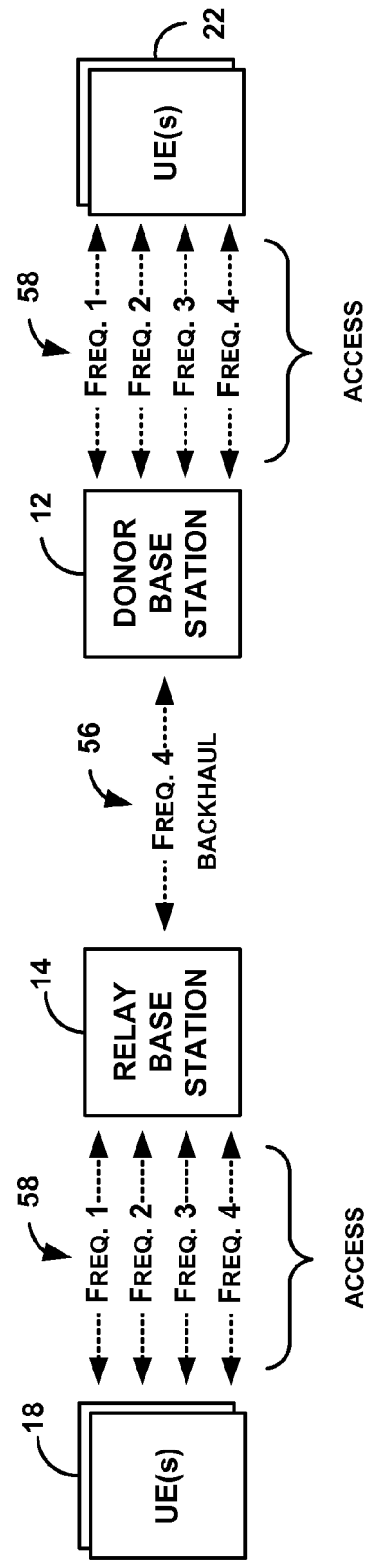

To help illustrate the possible arrangements, FIGS. 4A and 4B depict two example allocations of wireless communication resources. In particular, FIG. 4A depicts a dedicated carrier for relay backhaul arrangement, while FIG. 4B depicts a shared carrier for relay backhaul arrangement. For both of the examples depicted in FIGS. 4A and 4B, it is assumed that only four carrier frequencies are available for allocation.

Each carrier frequency may be a communication channel centered on a particular frequency. In accordance with a particular air interface protocol, a base station that radiates to define a given coverage area may support one or more frequency bands, such as the 800 MHz band (one or more frequency ranges around 800 MHz), the 1.9 GHz band (one or more frequency ranges around 1.9 GHz), and the 2.5 GHz band (one or more frequency ranges around 2.5 GHz), and may provide service one or more carrier frequencies within each supported band. In a frequency division duplex (FDD) arrangement, different carrier frequencies are used for the downlink than the uplink. Whereas, in a time division duplex (TDD) arrangement, the same carrier frequency is used for the downlink and uplink and is allocated over time among downlink and uplink communications.

As shown in FIG. 4A, three of the available carrier frequencies (i.e. Freq. 1, Freq. 2, and Freq. 3) are allocated for access communication while the fourth carrier frequency (Freq. 4) is reserved exclusively for backhaul communication. Thus, access communication between the relay base station 14 and UEs 18 as well as access communication between donor base station 12 and UEs 22 may occur on the first three carrier frequencies, and relay backhaul communication between the donor base station 12 and the relay base station 14 may occur on the fourth carrier frequency.

As shown in FIG. 4B, access communication between the relay base station 14 and UEs 18 as well as access communication between the donor base station and UEs 22 may occur on any of the four available carrier frequencies. Additionally, relay backhaul communication between the donor base station 12 and relay base station 14 may occur on the fourth carrier frequency. Thus, in the example arrangement of FIG. 4B, the fourth carrier frequency may be used for both relay backhaul communication and access communication.

As explained above, it may be desirable to dedicate one or more of the available carrier frequencies exclusively for relay backhaul link use, as in the arrangement of FIG. 4A. Dedicating one or more carrier frequencies for relay backhaul link use and using the remaining carrier frequencies for access link use would help eliminate any contention due to overcrowding of the donor base station. Unfortunately, at the same time, reserving one or more of the available carrier frequencies for relay backhaul link use would necessarily also reduce the number of carrier frequencies available for access link use.

For example, compare the arrangement of FIG. 4A with the alternative arrangement depicted in FIG. 4B. While in the arrangement of FIG. 4A only three carrier frequencies are available for to serve UEs in access communication, the example arrangement of FIG. 4B allows the fourth carrier frequency to also be used for access communication. Therefore in the arrangement of FIG. 4B, the donor base station and the relay base station have more carrier frequencies available to serve UEs than the donor base station and the relay base station have available in the example of FIG. 4A. As a result, higher data speeds can be achieved during access communication, or perhaps more UEs can be served, in the arrangement of FIG. 4B as compared to the arrangement of FIG. 4A, due to the additional carrier frequency available.

In practice, an operator of a wireless communication system may choose between either the arrangement of FIG. 4A (dedicated carrier for relay backhaul link) or the arrangement of FIG. 4B (shared carrier for relay backhaul link) when deploying a relay base station in a coverage area. For example, if an operator values the advantages of having a dedicated carrier frequency for the relay backhaul link, the operator may choose the arrangement of FIG. 4A. On the other hand, if the operator wishes to maximize the number of carrier frequencies to, for example, serve more UEs, provide more bandwidth to UEs, facilitate carrier aggregation in order to increase data speeds and thereby reduce UE battery consumption, etc., the operator may choose the arrangement of FIG. 4B.

According to the present method, an improved solution is to intelligently allocate any available wireless communication resources based on levels of one or any combination of various factors at a given instance. Such factors may include the remaining battery level of one or more UEs served by the relay base station and/or the donor base station, an amount of uplink buffered data, and an amount of downlink buffered data, among other possible factors.

A battery level or state of a UE may refer to an amount of energy or charge of a battery of the UE. In practice, determining a remaining battery level of a UE may involve receiving a report indicating a battery state of a UE. For instance, the UE may be programmed to report its remaining battery level in a message to the donor base station, either directly or via the relay base station. In some instances, the UE may be programmed to report its remaining battery level in response to the level reaching a threshold low level, or perhaps in response to one or more other triggering events. For instance, the UE may be programmed to report its remaining battery level when requesting to transmit data to the donor base station. The donor base station may then read the report so as to determine the remaining battery level of the UE. Additionally, if multiple UEs report a battery level over time, the determined remaining battery level may be an average battery level of the UEs.

The uplink buffered data may be data that one or more UEs that are served by the donor base station are requesting to transmit to the donor base station, data that one or more UEs that are served by the relay base station are requesting to transmit to the relay base station, or both. In some instances, the uplink buffered data may be determined for only UEs having a remaining battery level below a predefined threshold. In other instances, the uplink buffered data may be determined for any UEs, regardless of the remaining battery level of the UE.

In practice, determining uplink buffered data for a UE may involve receiving a buffer status report from the UE. The buffer status report may be a report indicating an amount of buffered data that the UE sends to a base station when the UE is requesting to transmit to the relay base station or to the donor base station. As one example, a UE being served by a relay base station may send a buffer status report to the relay base station, and the relay base station may read the buffer status report so as to determine the amount of uplink buffered data. As another example, a UE being served by a donor base station may send a buffer status report to the donor base station, and the donor base station may read the buffer status report so as to determine the amount of uplink buffered data.

The downlink buffered data may be data to be transmitted from the donor base station to one or more UEs that are served by the donor base station, the relay base station, or both. In practice, the donor base station may determine the amount of downlink buffered data based on any received requests to transmit data to the UEs served by the donor base station. As an example, the donor base station may receive a packet-date message or other communication that is intended for one of the UEs.

At a given instance, a donor base station or relay base station, or perhaps another network entity, may establish an allocation of wireless communication resources based on determined levels of one or a combination of the various factors described above. Establishing an allocation of wireless communication resources may refer to deciding what the allocation of wireless communication resources should be.

In one example, a donor base station may establish an allocation of wireless communication resources based on a determined remaining battery level. If UE battery power is generally low (e.g., below the predefined threshold), it would be useful to allocate more of the available wireless communication resources to the access link to, for example, help conserve UE battery power using carrier aggregation. For example, if four carrier frequencies are available, the established allocation may take the form of three carrier frequencies allocated for access communication (and carrier aggregation) and a single carrier frequency allocated to the relay backhaul link.

Therefore, in one instance, in response to determining that the determined remaining battery level is below a predefined threshold, the donor base station may establish an allocation having a greater extent of the wireless communication resources allocated to the relay access link than an extent of the wireless communication resources allocated to the relay backhaul link. In another instance, responsive to determining that the determined remaining battery level is below the predefined threshold, the donor base station may establish an allocation having a shared carrier frequency for the relay backhaul link.

In still another instance, in response to determining that the determined remaining battery level is not below the predefined threshold, the donor base station may establish an allocation having an equal extent of the wireless communication resources allocated to the relay access link and the relay backhaul link, or perhaps having a greater extent of wireless communication resources allocated to the relay backhaul link than an extent of the wireless communication resources allocated to the relay access link. Or alternatively, the donor base station may responsively establish an allocation having a dedicated carrier frequency for the relay backhaul link.

In another example, the allocation of wireless communication resources may be established based on the determined remaining battery level and a determined amount of uplink buffered data. For instance, responsive to determining that the determined remaining battery level is below a first predetermined threshold and that the determined amount of uplink buffered data is above a second predetermined threshold, the donor base station may establish an allocation having a greater extent of the wireless communication resources allocated to the relay access link than an extent of the wireless communication resources allocated to the relay backhaul link, and having a shared carrier frequency for the relay backhaul link. In another instance, responsive to determining that the determined remaining battery level is below a first predetermined threshold and that the determined amount of uplink buffered data is below a second predetermined threshold, the donor base station may establish an allocation having a greater extent of the wireless communication resources allocated to the relay access link than an extent of the wireless communication resources allocated to the relay backhaul link, but having a dedicated carrier frequency for the relay backhaul link.

In still other examples, the donor base station, or another entity, may establish the allocation based on the determined remaining battery level as well as a determined amount of downlink buffered data. For instance, responsive to determining that the determined remaining battery level is below a first predetermined threshold and that the determined amount of downlink buffered data is above a second predetermined threshold, the donor base station may establish an allocation having a greater extent of the wireless communication resources allocated to the relay access link than an extent of the wireless communication resources allocated to the relay backhaul link. In another instance, responsive to determining that the determined remaining battery level is below a first predetermined threshold and that the determined amount of downlink buffered data is below a second predetermined threshold, the donor base station may establish an allocation having a greater extent of the wireless communication resources allocated to the relay access link than an extent of the wireless communication resources allocated to the relay backhaul link.

Furthermore, in some examples, the donor base station may establish an allocation of wireless communication resources based on each of the determined remaining battery level, the determined amount of uplink buffered data, and the determined amount of downlink buffered data. By way of example, in response to determining that (a) the determined remaining battery level is below a first predetermined threshold, and (b) that either the determined amount of uplink buffered data or the determined amount of downlink buffered data is above a second predetermined threshold, the donor base station may establish an allocation having a shared carrier frequency for the relay backhaul link. On the other hand in response to determining that the determined remaining battery level is below the first predetermined threshold, but neither the determined amount of uplink buffered data nor the determined amount of downlink buffered data are above the second predetermined threshold, the donor base station may establish an allocation having a dedicated carrier frequency for the relay backhaul link.

Other examples of establishing the allocation of wireless communication resources are also possible.

Responsive to establishing what the allocation of the wireless communication resources should be, the donor base station or relay base station may configure the relay backhaul link and the relay access link based on the established allocation. For instance, if the donor base station establishes the allocation of wireless communication resources, the donor base station may provide instructions to the relay base station via the relay backhaul link. The instructions may indicate which carrier frequencies or bandwidth to use for the relay access link and which carrier frequencies or bandwidth to use for the relay backhaul link. By way of example, the donor base station may provide instructions to the relay base station over a control channel of the relay backhaul link. The instructions may be a list of wireless communication resources (e.g., carrier frequencies or other type of communication channels), including information designating whether each particular wireless communication resource is designated for the relay access link or the relay backhaul link. The instructions may take other forms as well.

Alternatively, if the relay base station establishes the allocation of wireless communication resources, the relay base station may itself configure the relay backhaul link and the relay access link. The relay base station may also provide instructions to the donor base station via a control channel on the relay backhaul link. The instructions may indicate which carrier frequencies or bandwidth are being used for the relay access link and the relay backhaul link.

Furthermore, the donor base station may also configure the donor access link based on the established allocation of wireless communication resources. For instance, in response to determining the established allocation of wireless communication resources or in response to receiving instructions indicating what the established allocation of wireless communication resources is, the donor base station may itself arrange the donor access link to use the same wireless communication resources as the relay access link.

Figure 5:
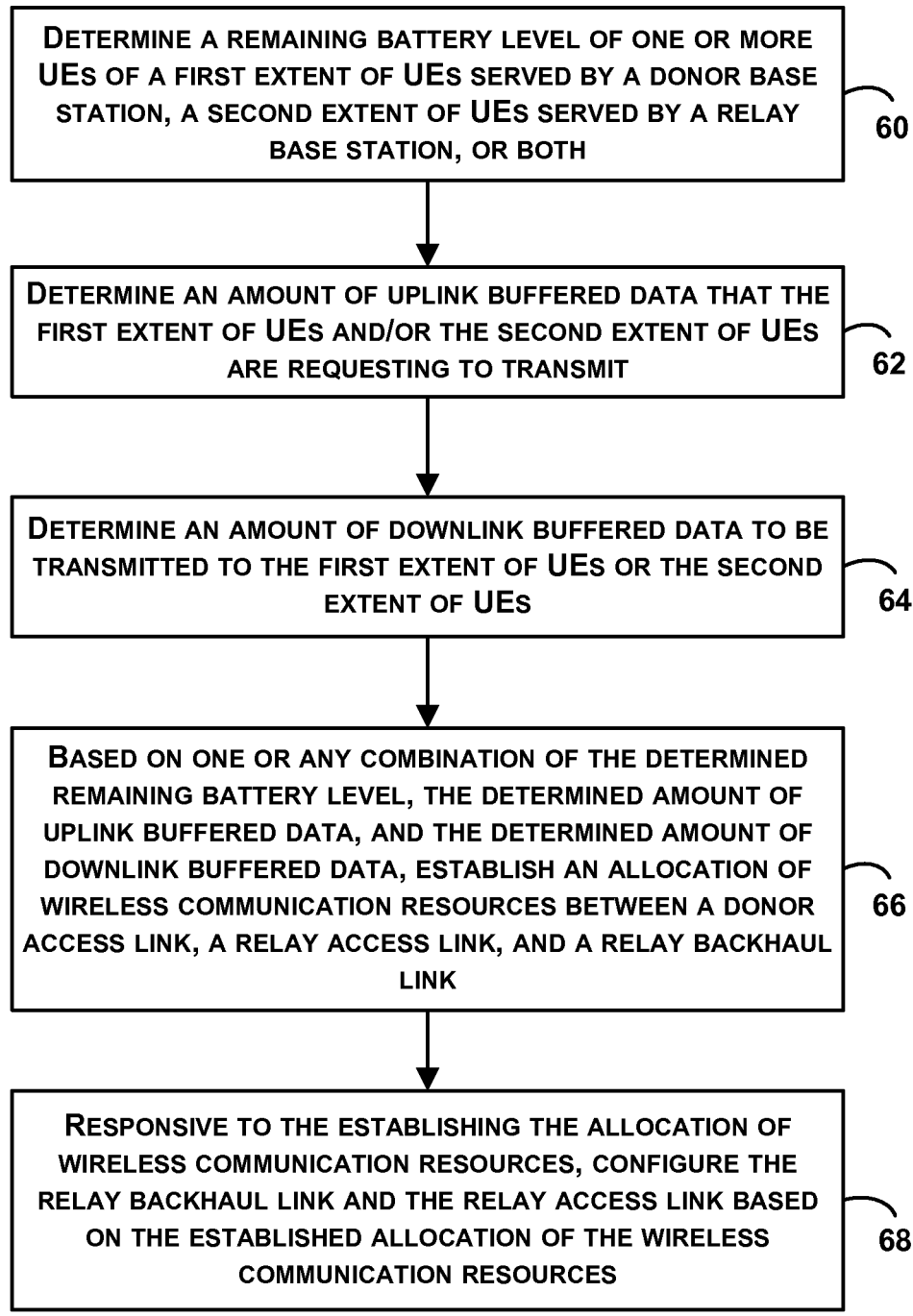
FIG. 5 is a flow chart depicting functions that can be carried out in accordance with the present method.

FIG. 5 is next a flow chart depicting functions that can be carried out in accordance with the present method. In practice, the method could be carried out by, for example, the donor base station or the relay base station of the wireless communication system of FIG. 1. But the functions depicted and described could be applied in other contexts as well.

As described above, according to the present method, an allocation of wireless communication resources may be established based on determined levels of one or any combination of various factors. Such factors may include the remaining battery level of one or more UEs served by the relay base station and/or the donor base station, an amount of uplink buffered data, and an amount of downlink buffered data, among other possible factors. For purposes of explanation, FIG. 5 depicts functions that can be carried out to determine the levels of three factors. In other examples, more or less factors may be determined. Thus, the flow chart illustrated in FIG. 5 is not meant to be limiting.

As shown in FIG. 5, at block 60, the method involves determining a remaining battery level of one or more UEs of a first extent of UEs served by a donor base station, a second extent of UEs served by a relay base station, or both. At block 62, the method involves determining an amount of uplink buffered data that the first extent of UEs and/or the second extent of UEs are requesting to transmit. At block 64, the method involves determining an amount of downlink buffered data to be transmitted to the first extent of UEs and/or the second extent of UEs. At block 66, the method then involves, based on one or any combination of the determined remaining battery level, the determined amount of uplink buffered data, and the determined amount of downlink buffered data, establishing an allocation of wireless communication resources between a donor access link, a relay access link, and a relay backhaul link. And at block 68, the method involves, responsive to the establishing the allocation of wireless communication resources, causing the relay base station to configure the relay backhaul link and the relay access link based on the established allocation of the wireless communication resources.

In line with the discussion above, in one example, the donor base station may determine the remaining battery level of one or more UEs in the first extent of UEs and/or the second extent of UEs. The donor base station may then establish an allocation of wireless communication resources by, for example, comparing the determined remaining battery level to a predetermined threshold. As an example, the predetermined threshold may be 25% remaining battery, 30% remaining battery, etc. And responsive to establishing the allocation of the wireless communication resources, the donor base station may configure the relay access link and the relay backhaul link by providing instructions to the relay base station.

In one instance, the established allocation may be an allocation having a greater extent of the wireless communication resources allocated to the relay access link than an extent of the wireless communication resources allocated to the relay backhaul link. In other instances, the established allocation may be an allocation having an equal extent of the wireless communication resources allocated to the relay access link and the relay backhaul link, or perhaps having a greater extent of wireless communication resources allocated to the relay backhaul link than an extent of the wireless communication resources allocated to the relay access link. Additionally, the established allocation may have either a dedicated carrier frequency for the relay backhaul link or a shared carrier frequency for the relay backhaul link.

Further, in line with the discussion above, in another example, the relay base station may establish the allocation of wireless communication resources based on a determined remaining battery level as well as the determined amount of uplink buffered data and/or the determined amount of downlink buffered data. And responsive to establishing the allocation of wireless communication resources, the relay base station may configure the relay access link and the relay backhaul link.

Various embodiments have been described above. Those skilled in the art will appreciate, however, that changes from the embodiments are possible, while remaining within the scope of the claims.

We claim:

1. A method comprising:
   determining a remaining battery level of one or more user equipment devices (UEs) that are served by a relay base station, wherein the one or more UEs that are served by the relay base station communicate with the relay base station over a relay access link, and the relay base station in turn communicates with a donor base station over a relay backhaul link;
   establishing an allocation of wireless communication resources between the relay backhaul link and the relay access link based at least on the determined remaining battery level of the one or more UEs that are served by the relay base station; and
   responsive to the establishing the allocation of the wireless communication resources, configuring the relay backhaul link and the relay access link based on the established allocation of the wireless communication resources to the relay base station.

2. The method of claim 1, further comprising:
   determining a remaining battery level of one or more UEs that are served by the donor base station,
   wherein the establishing the allocation of the wireless communication resources is based at least on the determined remaining battery level of the one or more UEs that are served by the relay base station and the determined remaining battery level of the one or more UEs that are served by the donor base station.

3. The method of claim 2:
   wherein the one or more UEs that are served by the donor base station communicate with the donor base station over a donor access link, and
   wherein the donor access link and the relay access link share a common portion of the wireless communication resources.

4. The method of claim 1, wherein the wireless communication resources comprise an extent of frequency spectrum.

5. The method of claim 4, wherein the extent of frequency spectrum comprises a number of carrier frequencies or a bandwidth of frequency spectrum.

6. The method of claim 1:
   wherein the one or more UEs that are served by the relay base station comprise a plurality of UEs, and
   wherein the remaining battery level of the plurality of UEs comprises an average battery level of the plurality of UEs.

7. The method of claim 1, further comprising:
   determining an amount of uplink buffered data that the one or more UEs that are served by the relay base station are requesting to transmit to the relay base station,
   wherein the establishing the allocation of the wireless communication resources is based at least on the determined remaining battery level of the one or more UEs that are served by the relay base station and the determined amount of uplink buffered data that the one or more UEs that are served by the relay base station are requesting to transmit to the relay base station.

8. The method of claim 1, further comprising:
   determining an amount of downlink buffered data to be transmitted from the donor base station to the one or more UEs that are served by the relay base station,
   wherein the establishing the allocation of the wireless communication resources is based at least on the determined remaining battery level of the one or more UEs that are served by the relay base station and the determined amount of downlink buffered data to be transmitted from the donor base station to the one or more UEs that are served by the relay base station.

9. The method of claim 1, wherein the donor base station establishing the allocation of the wireless communication resources between the relay backhaul link and the relay access link based at least on the determined remaining battery level of the one or more UEs that are served by the relay base station comprises:
   determining that the determined remaining battery level of the one or more UEs that are served by the relay base station is below a predefined threshold, and
   responsive to determining that the determined remaining battery level of the one more UEs that are served by the relay base station is below the predefined threshold, establishing, as the allocation of the wireless communication resources, an allocation having a greater extent of the wireless communication resources allocated to the relay access link than an extent of the wireless communication resources allocated to the relay backhaul link.

10. A donor base station comprising:
    a wireless communication module for engaging in access communication with a first extent of user equipment devices (UEs) over a donor access link and for engaging in relay backhaul communication with a relay base station over a relay backhaul link, wherein the relay base station in turn engages in access communication with a second extent of UEs over a relay access link;
    a processing unit;
    data storage; and
    program logic stored in the data storage and executable by the processing unit to manage allocation of wireless communication resources between the donor access link, the relay access link, and the relay backhaul link, wherein managing allocation of the wireless communication resources between the donor access link, the relay access link, and the relay backhaul link comprises carrying out functions including (i) determining a remaining battery level of one or more UEs of the first extent of UEs, the second extent of UEs, or both, (ii) based at least on the determined remaining battery level of each of the one or more UEs, establishing an allocation of the wireless communication resources between the donor access link, the relay access link, and the backhaul link, and (iii) causing the relay base station to configure the relay backhaul link and the relay access link based on the established allocation of the wireless communication resources.

11. The donor base station of claim 10, wherein the wireless communication resources comprise a number of carrier frequencies or a bandwidth of frequency spectrum.

12. The donor base station of claim 10, wherein the donor access link and the relay access link share a common portion of the wireless communication resources.

13. The donor base station of claim 10:
wherein the functions further comprise determining an amount of uplink buffered data that the first extent of UEs and the second extent of UEs are requesting to transmit to the donor base station and the relay base station respectively based on one or more buffer status reports received from the first extent of UEs, the second extent of UEs, or both, and
wherein the establishing the allocation of the wireless communication resources is based at least on the determined remaining battery level of each of the one or more UEs and the determined amount of uplink buffered data.

14. The donor base station of claim 10:
wherein the functions further comprise determining an amount of downlink buffered data to be transmitted from the donor base station to the first extent of UEs, and
wherein the establishing the allocation of the wireless communication resources is based at least on the determined remaining battery level of each of the one or more UEs and determined the amount of downlink buffered data.

15. In a wireless communication system in which a donor base station engages in access communication with a first extent of user equipment devices (UEs) over a donor access link and engages in relay backhaul communication with a relay base station over a relay backhaul link, and the relay base station in turn engages in access communication with a second extent of UEs over a relay access link, a non-transitory computer readable medium having stored thereon instructions executable by a processing unit to carry out functions comprising:
determining a remaining battery level of one or more UEs of the first extent of UEs, the second extent of UEs, or both;
based at least on the determined remaining battery level of each of the one or more UEs, establishing an allocation of wireless communication resources between the donor access link, the relay access link, and the relay backhaul link; and
responsive to establishing the allocation of the wireless communication resources, configuring the donor access link, the relay access link, and the relay backhaul link based on the established allocation of the wireless communication resources.

16. The non-transitory computer readable medium of claim 15, wherein the instructions further comprise instructions for:
determining an amount of uplink buffered data that the first extent of UEs and the second extent of UEs are requesting to transmit to the donor base station and the relay base station respectively based on one or more buffer status reports received from the first extent of UEs, the second extent of UEs, or both,
wherein the establishing the allocation of the wireless communication resources is based at least on the determined remaining battery level of each of the one or more UEs and the determined amount of uplink buffered data.

17. The non-transitory computer readable medium of claim 15, wherein the instructions further comprise instructions for:
determining an amount of downlink buffered data to be transmitted from the donor base station to the first extent of UEs,
wherein the establishing the allocation of the wireless communication resources is based at least on the determined remaining battery level of each of the one or more UEs and the determined amount of downlink buffered data.

18. The non-transitory computer readable medium of claim 15, wherein the donor access link and the relay access link share a common portion of the wireless communication resources.

19. The non-transitory computer readable medium of claim 15, wherein the wireless communication resources comprise a number of carrier frequencies or a bandwidth of frequency spectrum.

20. The non-transitory computer readable medium of claim 15, wherein the wireless communication resources comprise a number of Long Term Evolution frequency channels.

* * * * *